INVENTORS
JACK D. BETZ
GLEN E. GUY
BY, W. J. Shanley, Jr.
ATTORNEY

INVENTORS
JACK D. BETZ
GLEN E. GUY
BY, W. J. Shanley, Jr.
ATTORNEY

INVENTORS
JACK D. BETZ
GLEN E. GUY
BY, W. J. Shanley, Jr.
ATTORNEY

INVENTORS
JACK D. BETZ
GLEN E. GUY
BY, W. J. Shanley, Jr.
ATTORNEY

INVENTORS
JACK D. BETZ
GLEN E. GUY

BY, W. J. Shanley Jr.

ATTORNEY

INVENTORS
JACK D. BETZ
GLEN E. GUY
BY, W. J. Shirley, Jr.
ATTORNEY

TRANSMISSION OF SIGNALS BY MASTER STATION

INVENTORS
JACK D. BETZ
GLEN E. GUY
BY, W. J. Shanley Jr.
ATTORNEY

United States Patent Office 3,439,329
Patented Apr. 15, 1969

3,439,329
ELECTRONIC ERROR DETECTION AND MESSAGE ROUTING SYSTEM FOR A DIGITAL COMMUNICATION SYSTEM

Jack D. Betz, Danver, and Glen E. Guy, Andover, Mass., assignors to General Electric Company, a corporation of New York Filed May 5, 1965, Ser. No. 453,452
Int. Cl. G08b *29/00;* G06f *11/00;* H04b *1/00*
U.S. Cl. 340—146.1 8 Claims

ABSTRACT OF THE DISCLOSURE

An electronic error detection and message routing system for digital message processing. A message formed of binary bits is transmitted serially on a communication line. The message is simultaneously convolutionally processed to form a parity digit including a plurality of parity bits. Such messages are transmitted and received by master and remote stations. All remote stations will properly decode an errorless message received from the master but not from other remotes.

This invention relates to electronic digital data communication systems and more particularly to an electronic error detection system which is also effective to perform a message routing function in a digital communication system.

A common type of digital communication system having wide industrial and commercial applications is a digital telemetering system utilized for supervisory control of functions at a plurality of locations remote from the master station. Such systems also perform, in addition to the control functions, data transmission functions which permit the operator at the master station to read out, display, or store data collected at any one of the plurality of remote stations.

This invention is more particularly related to a scanning type communication system in which the master station is in command and continually asks for and receives information from each remote station. Systems of this type permit any number of remote stations to be controlled by one master over a common communication channel. The term "point" as hereinafter utilized defines a separate function which is either controlled, monitored, or telemetered. During each master scan cycle of such systems, the master sequentially queries a plurality of remote stations by sequentially sending out messages containing the addresses of the points to be sequentially interrogated. In addition, each transmission contains a command digit which determines the type of function to be performed with respect to the addressed point. Such messages call for a response on the part of the remote station containing the addressed point, which response is in the form of a message transmitted over the common channel to the master station.

In prior art type systems, such a response would be ignored by all the other remote stations since in such systems provisions are made at the beginning of each group of transmissions between the master and the addressed point to automatically lock out all other remote stations. Thereafter, transmissions between the master and the addressed remote station cannot accidentally operate other remote stations. However, with such a system it is necessary for the master station to reset all the remote stations after transmissions have been completed between the addressed point and the master station in order to permit all the remote stations of the system to monitor the next transmission. This required the generation of a short message for reset purposes in addition to the normal message length used for data communication purposes. This has been found to unnecessarily complicate the control circuitry of the master and the remote stations.

It is therefore highly desirable to provide a digital communication system having a common channel between a master and a plurality of remote stations in which each remote station is capable of continually scanning each transmission over the common channel to determine whether the message is intended for an associated point. However, to permit the utilization of such a system, means has to be provided to prevent a transmission of a remote station from being accepted by another remote station due to the accidental addressing of a point in the other remote station due to the information in the message intended for the master station coincidentally being identical with an address of another point in the system.

Provisions also have to be made in such systems for detecting errors which occur during transmission. It has become common practice in digital communication systems generally to utilize cyclic codes to detect errors. The use of such codes commonly results in the generation of a parity digit which is transmitted along with the address and command digits of the message in order to permit the detection of any transmission errors. Thus, it would be highly desirable to additionally provide the required message routing function without additional circuitry while maintaining the error detection function so as to permit the utilization of a telemetering and supervisory control system in which the remote stations continually scan every transmission appearing upon the common channel but do not accept messages from other remote stations.

It is therefore an object of this invention to provide an electronic error detection and message routing system for a digital communication system.

It is a further object of this invention to provide an electronic error detection and message routing system for a digital communication system which involves the utilization of cyclic codes for both error detection and message routing purposes.

It is well known that utilizing one type of cyclic code, the transmitted message, which is in the form of a cyclical code or code polynomial F(X), is generated by encoding the message polynomial G(X) by dividing $X^{n-k}G(X)$ by the generator polynomial $P(X)$ and then appending the remainder $R(X)$ resulting from this division to $X^{n-k}G(X)$ wherein:

$n$=total length of code polynomial being transmitted
$k$=total length of message polynomial It may be shown that the $k$ highest order coefficients of the transmitted message F(X) are the same as the coefficients of the message polynomial G(X) which contains the information to be transmitted, while the low order $n-k$ coefficients of the transmitted message are the coefficients of the remainder R(X) which was appended to the message polynomial G(X) to act as a parity digit. It can be demonstrated that by selecting the proper generator polynomial P(X) the resultant code polynomial F(X) will be evenly divisible by P(X) if the message received was free of errors.

This processing of the message digit, which may be termed "convolutional processing," is carried out in prior art systems for message detection purposes by utilizing a shift register having a number of stages equal to the degree of the highest order of the generator polynomial P(X). In addition, a collection of modulo-two adders which are equivalent to the logical operation EXCLUSIVE OR are also utilized.

It will be appreciated that the message polynomial G(X) may be multiplied by $X^{n-k}$ by shifting G(X) into the shift register and then annexing $n-k$ zeros to the end of the message. Simultaneously with the shifting of the message into the shift register, the contents of the shift register may be divided by the generator polynomial P(X) by feeding back signals in the shift register to appropriately placed interstage modulo-two adders. When the last zero to be added to the message polynomial enters the shift register, the division operaton will be completed, resulting in the remainder R(X) being found in the shift register. By appending this remainder to the end of the message digit G(X), the desired code polynomial F(X) is created. When a signal corresponding to this polynomial is received, the absence of an error is indicated by the presence of a zero remainder in the shift register which will hereinatfer be referred to as the digit generator.

In accordance with our invention, the error detection capabilities of this type system are retained, and in addition, a message routing function is obtained by encoding the output of the digit generator of a remote station in a different manner from that which takes place at the master station. Decoding networks of master and remote stations also differ in a corresponding manner. This will prevent a remote station transmission intended for the master station from being accepted by any other remote station. In accordance with our invention, this is accomplished without interfering in any manner with the error-detecting capabilities of the parity digit. In the illustrated preferred embodiment of the invention, remote stations will accept messages which provide a 0000 remainder while the master station will accept only messages providing a 1000 remainder.

It is another feature of the invention to provide means for detecting transmission errors of a type which is evidenced by a change in state of the bit signals on the common channel during a portion of each bit period in which no changes would take place except for the presence of a transmission error. Means are also provided to prevent the acceptance of a message in which such a change of state has been detected.

Thus, in accordance with the invention, an additional code security check is readily obtained in addition to the message routing function previously discussed.

The foregoing and other objects, features, and advantages of the invention will be apparent from the following description of the preferred embodiment of the invention as illustrated in the accompanying drawings in which:

FIGURE 1 is a schematic representation of a digital communication system in accordance with the invention;

FIGURES 2*a*, 2*b*, and 2*c* are schematic representations of a master station transceiver embodying the invention;

Figure 9:
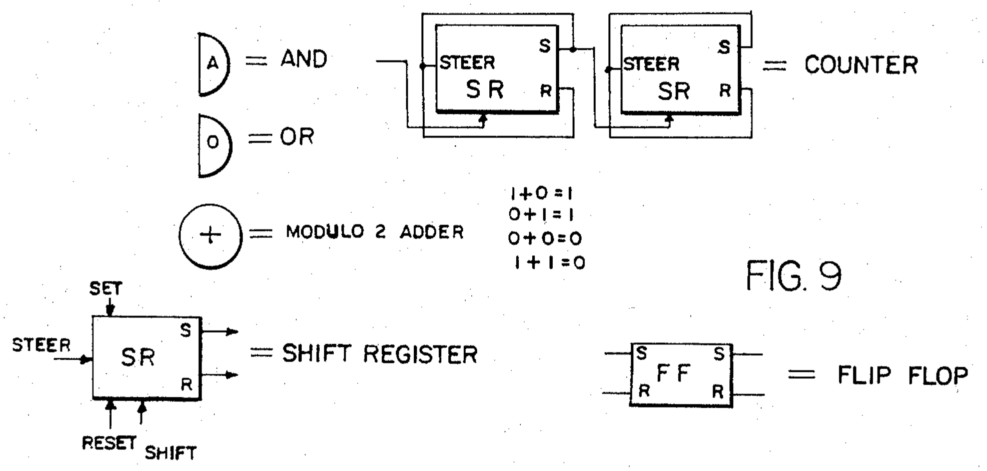
Figure 6:
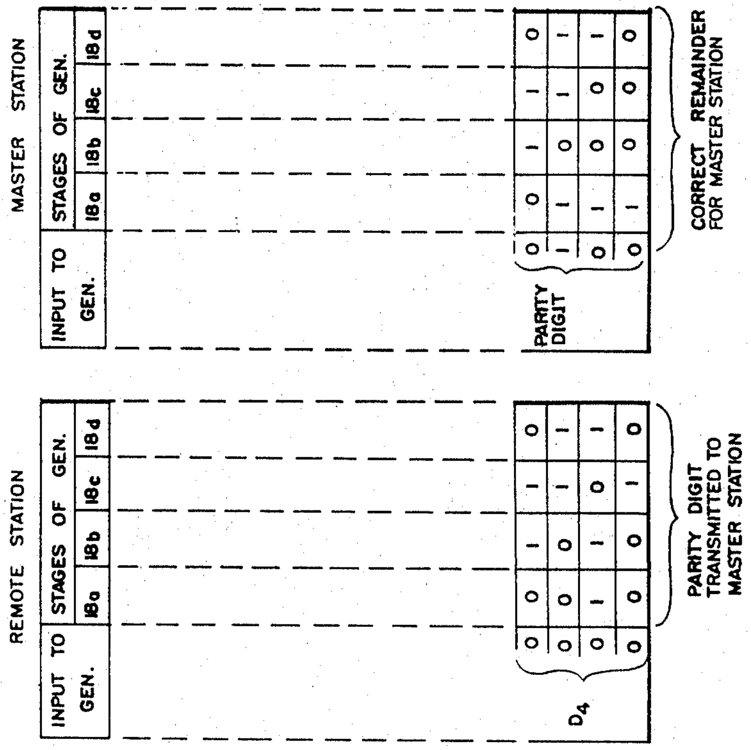
Figure 5:
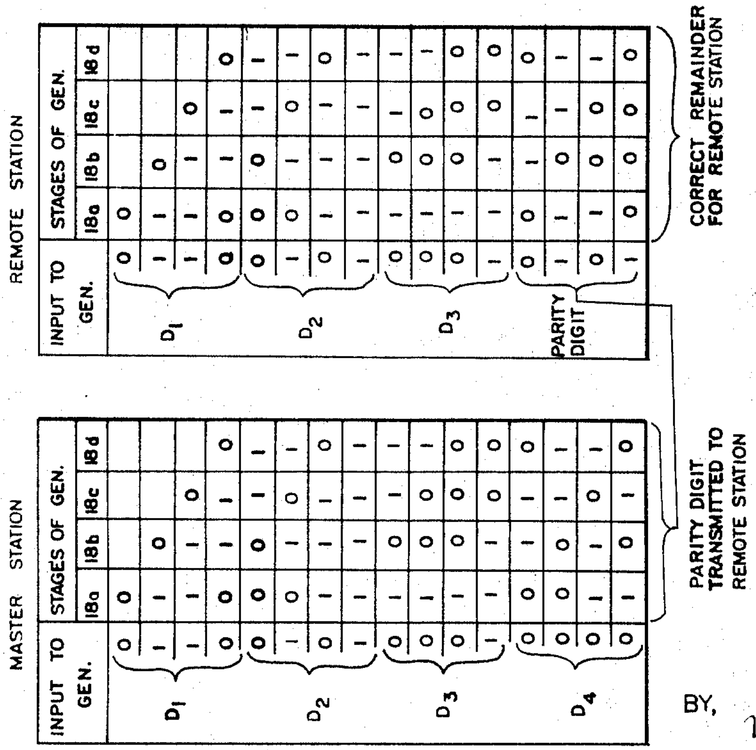
Figure 7:
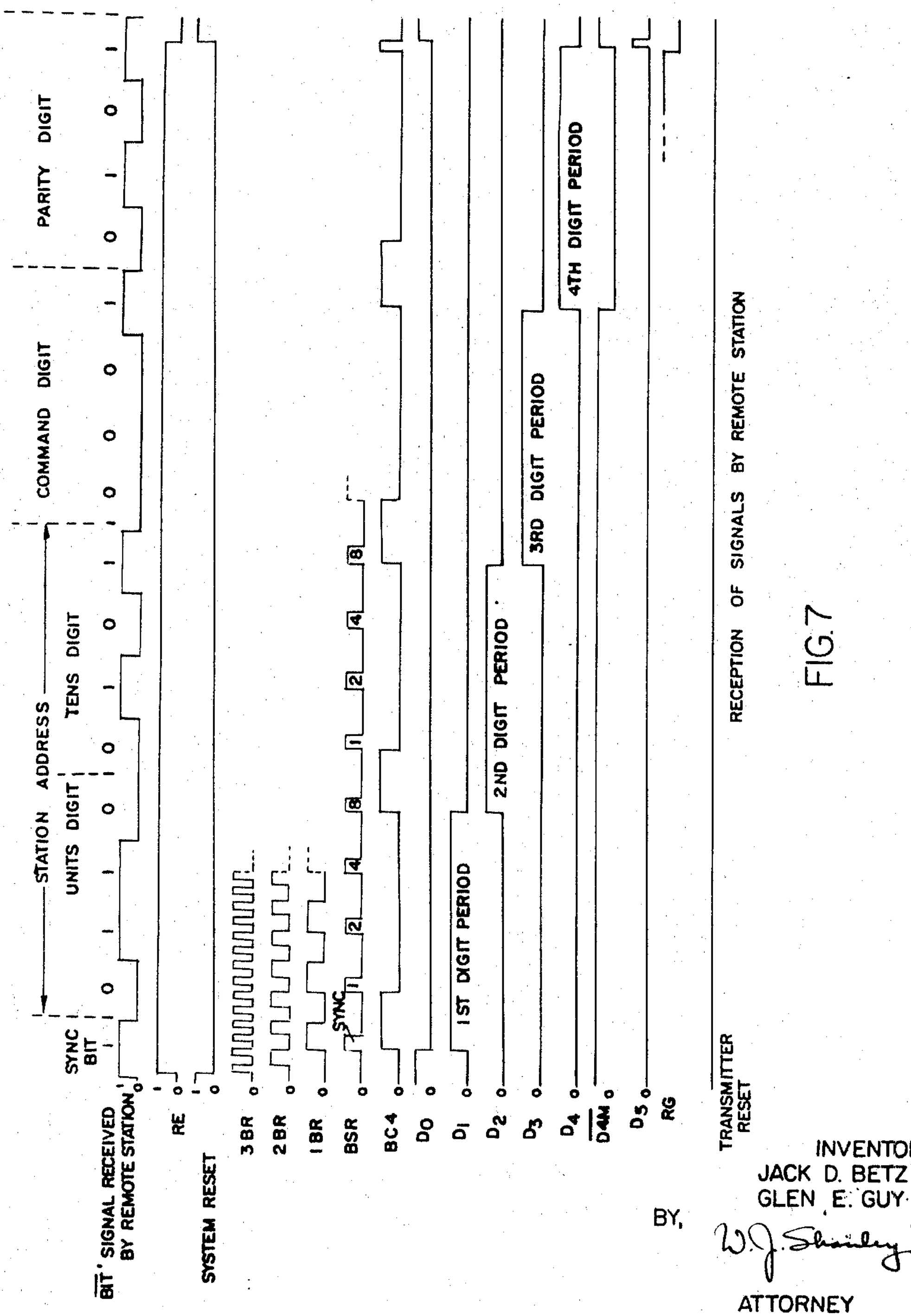
Figure 8:
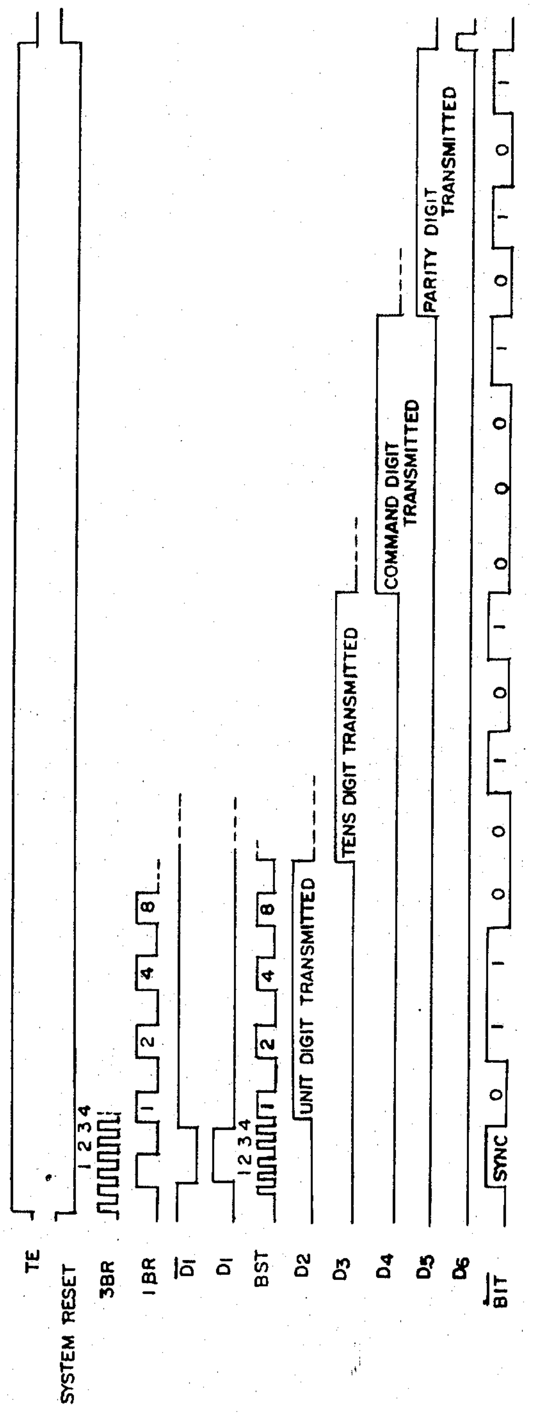

FIGURE 5 contains representations in chart form of the contents of the digit generators of master and remote stations during a transmission to a remote station;

FIGURE 6 contains representations in chart form of the contents of the digit generators of master and remote stations during a transmission to the master station;

FIGURE 7 is a diagrammatic timing chart of signal and control pulses present at different points in a remote station during reception of a message;

FIGURE 8 is a diagrammatic timing chart of signal and control pulses present at different points in a master station during the transmission of a message; and FIGURE 9 contains a chart explaining the symbols utilized in FIGURES 1–8.

GENERAL DESCRIPTION

Figure 1:
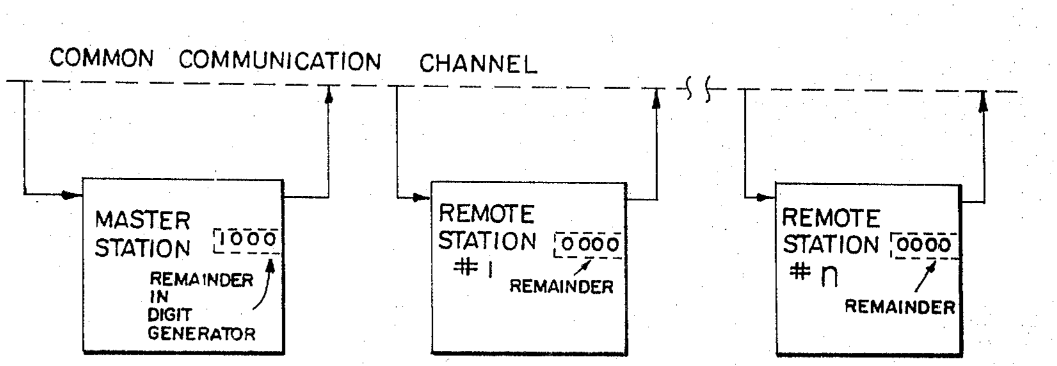

Referring now to FIGURE 1, there is illustrated a telemetering supervisory control system comprising a master station and a plurality of remote stations which are interconnected by a common communication channel which may be a line wire channel, a telephone line and carrier, a microwave carrier, or any other of a number of well-known signal communication links which may be coupled between the master and the remote stations. Each station in the system is substantially identical with all other stations of the system except to the extent that will hereafter be discussed with respect to the showing of FIGURE 4 which describes the differences in the encoder and decoder associated with the digit generator of each remote station. These differences account for the fact that a master station will accept only a message which leaves a remainder of 1000 in the digit generator while each remote station will accept only a message leaving a remainder of 0000. Thus, the discussion relating to the operation of the master station transceiver of FIGURE 2 in both its transmitting and receiving modes of operation will be equally applicable to both the master and remote stations except to the extent discussed with respect to FIGURE 4.

Figure 2A:
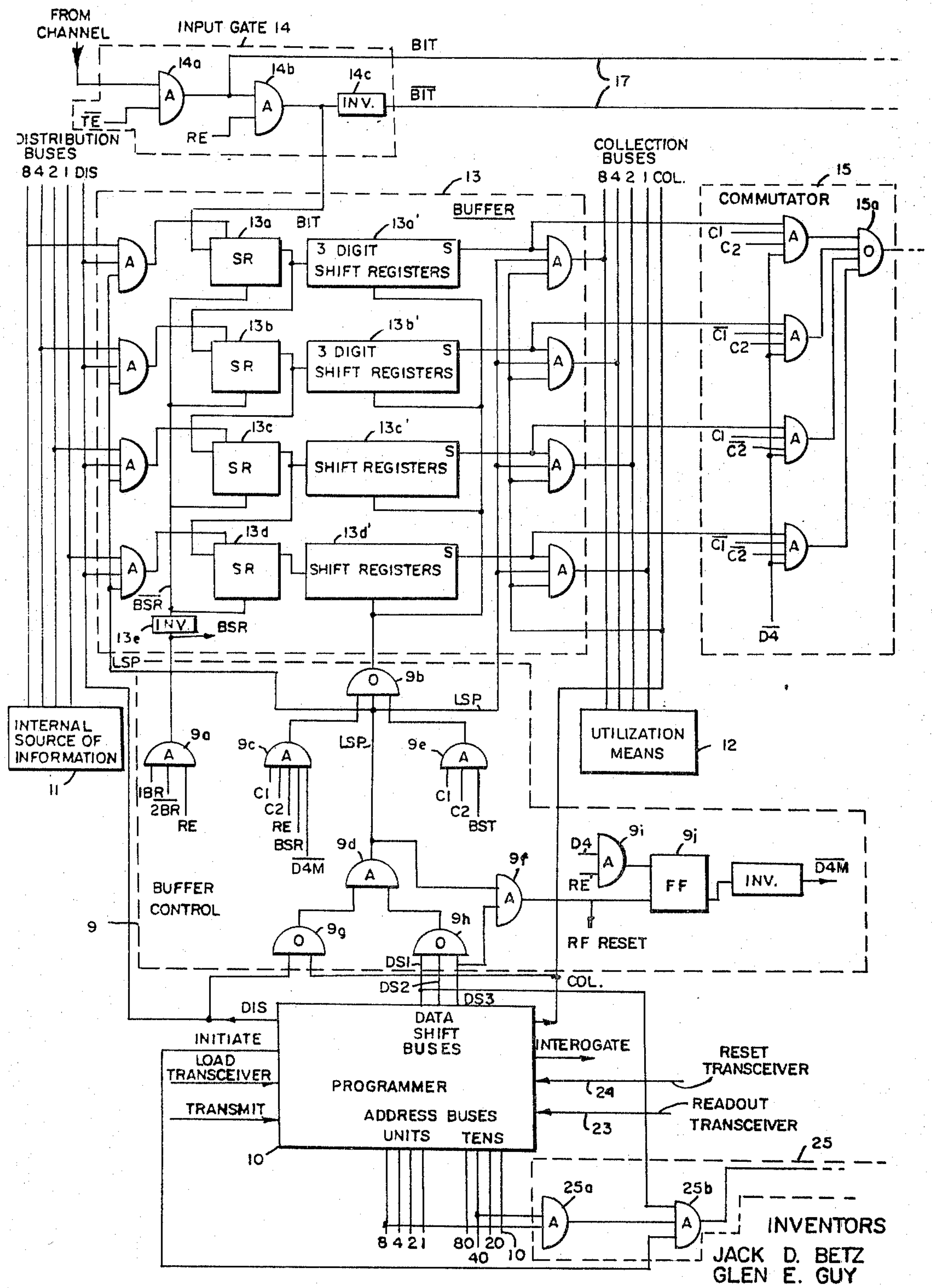
Figure 2B:
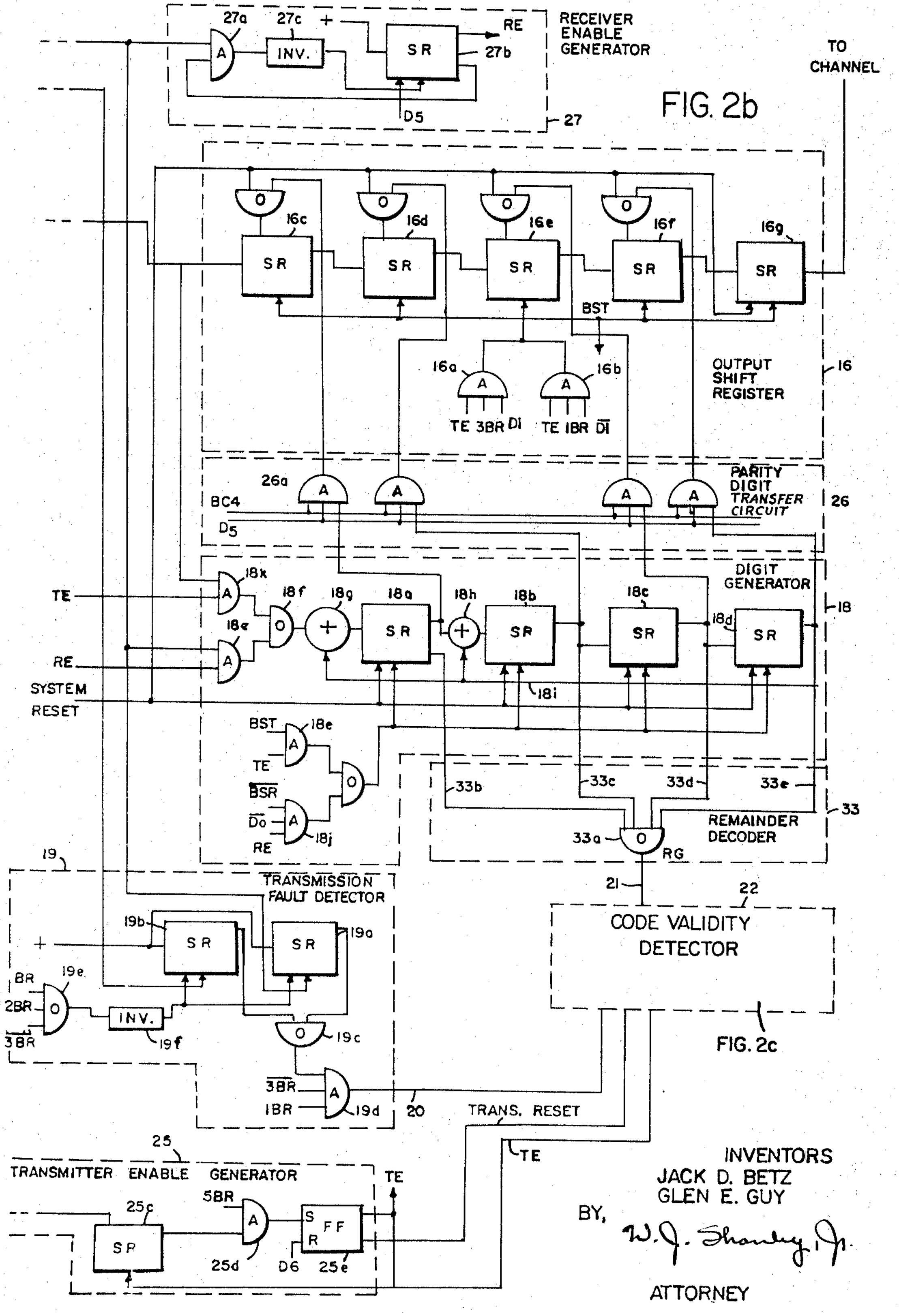

Referring now to FIGURE 2, only those portions of the transceiver and other components of a master station of a supervisory control system necessary to describe the invention have been illustrated. Thus, a transceiver associated with a PROGRAMMER 10 is shown in detail. Furthermore, to somewhat simplify the following discussion, a memory unit normally integral with the PROGRAMMER 10 is shown as an INTERNAL SOURCE OF INFORMATION 11 and UTILIZATION MEANS 12 diagrammatically represented in block diagram form. For example, when it is desired to read information from the INTERNAL SOURCE OF INFORMATION 11 into the BUFFER 13 of the transceiver, the data shift pulses and the information on the DISTRIBUTION BUSES combine so the information is transferred to the BUFFER 13 of the transceiver. Even though the information appears at the input of all digital information circuits, only the transceiver will respond to the information if the address placed on the ADDRESS BUSES of the PROGRAMMER 10 is the transceiver address. In a like manner, the COLLECTION BUSES provide means for reading information in the BUFFER 13 of the transceiver or other selected digital information circuit into the UTILIZATION MEANS 12 under control of the COL and DATA SHIFT signals at the PROGRAMMER 10.

Information can also be read into the transceiver from the channel through INPUT GATE 14 and BUFFER 13. It will also be appreciated that information contained in BUFFER 13 may be read out onto the communication channel through COMMUTATOR 15 and OUTPUT SHIFT REGISTER 16.

*Transmission mode of operation*

As the master station and each remote station in a supervisory control system constructed in accordance with this invention contain at least a PROGRAMMER 10 and a memory which constitutes the INTERNAL SOURCE OF INFORMATION 11 and the UTILIZATION MEANS 12 together with the transceiver, discussion of transmission onto the common channel is discussed without reference to either the master station or remote stations as operation is identical with the exception of encoding and decoding parity information. Assuming that a command entry circuit having an address of "50" is associated with a particular PROGRAMMER 10 and that it is desired to put the information in the command entry circuit onto the common communication channel, the PROGRAMMER 10 would initially be energized to cause an address "50" to be put on the ADDRESS BUSES and an appropriate command signal to be issued to cause the information in the command entry circuit to be stored in the INTERNAL SOURCE OF INFORMATION 11. Normally such a command would be wired into the command entry circuit to automatically cause transfer of the information into the INTERNAL SOURCE OF INFORMATION 11.

Once the information is in the memory of the PROGRAMMER 10 or the INTERNAL SOURCE OF IN- FORMATION 11, a "LOAD TRANSCEIVER" command could be given to the PROGRAMMER 10 together with the transceiver address (e.g., "48"). Sufficient binary logic is associated with the transceiver so that the AND GATE 25*a* produces an output signal only when an address "48" appears on the ADDRESS BUSES of the PROGRAMMER 10. This output signal is then applied to the AND GATES in the BUFFER 13 so that in combination with the information from the INTERNAL SOURCE OF INFORMATION 11, logic shift pulses (LSP) and DIS pulses, the information is loaded into the BUFFER 13.

Such information will be held in BUFFER 13 until PROGRAMMER 10 both addresses the transceiver by energizing appropriate ones of the ADDRESS BUSES and generates the INITIATE signal so as to energize TRANSMITTER ENABLE GENERATOR 25. This generator provides the required transmit enable signal TE which permits the information appearing at the output of COMMUTATOR 15 to be read into DIGIT GENERATOR 18 at the same time that it is being read into OUTPUT SHIFT REGISTER 16 under control of the shift pulses appearing at the output of gate 9*c*. COMMUTATOR 15, which is controlled by the signals of BIT COUNTER 30 (FIGURE 3), converts the parallel information at the output of BUFFER 13 to a serial form. As the information is shifted into DIGIT GENERATOR 18, the required convolutional processing takes place so that upon the entry of the last zero into the generator, the appropriate digit is generated which, when encoded by PARITY DIGIT TRANSFER CIRCUIT 26, will provide the required parity digit for checking the transmission at the remote station to which the message is directed.

Of course, it will be recognized that when the message is being transmitted from the master station, all remote stations will be placed in the reception mode of operation in a manner similar to that which will now be described with respect to all transceivers.

*Reception mode of operation*

During a reception mode of operation when signals are being received from the channel into each transceiver, the signals upon the channel are applied through INPUT GATE 14 to BUFFER 13 where they are stored temporarily awaiting the outcome of the error detection tests. In order to perform these error-detecting operations, the BIT signal appearing at the output of GATE 14 is fed over conductor 17 to the input of DIGIT GENERATOR 18 where the message is checked to ascertain whether an acceptable remainder will be generated in the digit generator upon completion of the reception operation. At the same time BIT and $\overline{\text{BIT}}$ signals are also applied to the input of TRANSMISSION FAULT DETECTOR 19 to determine whether these message signals change state during certain portions of the bit period.

Figure 2C:
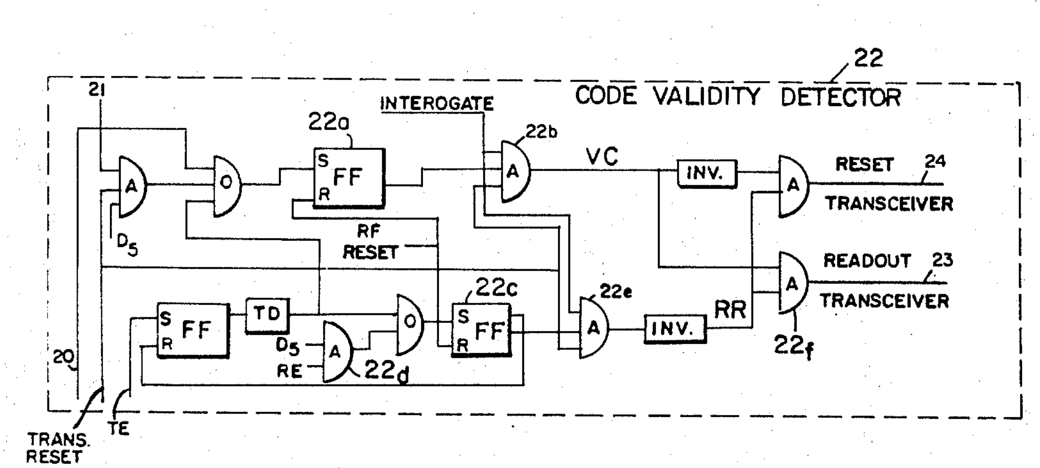

Failure of the incoming signal to pass the transmission fault test will result in generating a signal on conductor 20 while the appearance of a signal on conductor 21 will indicate failure to pass the remainder test. Referring now to FIGURE 2*c*, if neither of these signals is applied to MESSAGE VALIDITY DETECTOR 22, the READOUT TRANSCEIVER signal will be generated on output conductor 23 when the transceiver isi nterrogated by PROGRAMMER 10 at each station. This signal will cause PROGRAMMER 10 to generate COL and DS1–DS3 control signals which will cause the information to be read out of BUFFER 13 and into UTILIZATION MEANS 12 over the COLLECTION BUSES. Thereafter, the PROGRAMMER 10 analyzes the information to determine what further action must be taken as a result of data sent to it.

MESSAGE VALIDITY DETECTOR 22 also provides, when the transceiver is interrogated, the RESET TRANSCEIVER signal on output conductor 24 which, when applied to PROGRAMMER 10, will cause the transceiver to be reset to prevent the message in BUFFER 13 from being read into UTILIZATION MEANS 12.

Therefore, if a proper remainder is not obtained upon completion of reception by one of the stations (e.g., 0000 at a remote station or 1000 at the master station) or if the TRANSMISSION FAULT DETECTOR 19 senses an error in the transmission, the information is not transferred to the memory in the PROGRAMMER 10 associated with that particular station, and no response will occur. An absence of a response signifies a transmission error. In a like manner when information is transmitted from the remote station to the master station, a failure to obtain an answer from the master station will similarly signify a transmission error.

The transceiver described in the following detailed description therefore performs a plurality of functions. First, it commutates the information in a message from serial to parallel form or from parallel to serial form depending on the mode of operation. Secondly, while placing the information on a transmission channel or receiving the information from the transmission channel, the transceiver generates or decodes a parity check signal internally to determine whether an error has been introduced into the message or whether the information received in the transceiver should be placed into the PROGRAMMER 10 for further processing. Furthermore, generation of the parity digit prevents reception of a signal from a remote station by another remote station; only at the master station will it be possible to unload the transceiver into a UTILIZATION MEANS 12.

DETAILED DESCRIPTION

Referring first to FIGURE 9, it is believed that the symbols and the structure they represent are self-explanatory. For the purposes of this discussion, it will be assumed that no signal inversion takes place when a signal passes through a gate. The shift register stages utilized in the system of the invention can be utilized to provide either a multi-stage shift register or a multi-stage counter. Reference may be had to OUTPUT SHIFT REGISTER 16 of FIGURE 2*b* for an example of the manner in which shift register stages of FIGURE 9*d* may be interconnected to provide a multi-stage shift register. The shift register stages utilized in the system of the invention require the presence of a pair of complementary signals upon a pair of steering terminals as well as the presence of a shift pulse upon the SHIFT input in order to permit the entry of information into the stage. However, for simplification purposes only one input signal and one STEER input will be shown. It is also noted that the actual shifting operation takes place on the trailing edge of the shift pulse. The shift register stage utilized can also be placed in its 1 condition without requiring the presence of a signal upon the SHIFT input by applying a pulse to the SET input.

In accordance with conventional practice, the set output S of the shift register will be in its 1 condition when the register is in its 1 condition while the reset output R will be in its 1 condition when the shift register contains a 0.

Referring now to FIGURE 9, it may be seen that when the set and reset outputs of a shift register stage are returned to the STEER input and pulses to be counted are applied tot he SHIFT input, the shift register will operate as a counter so as to permit the counting of signals applied to the SHIFT input.

Figure 3:
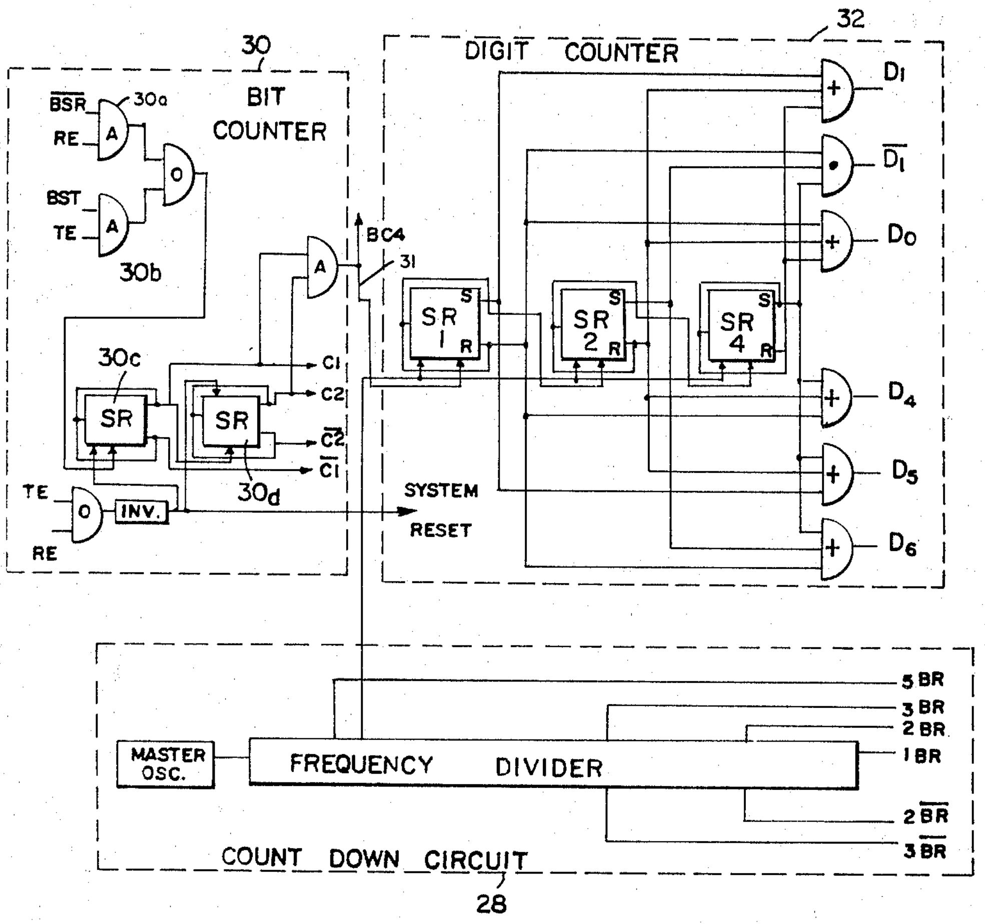
FIGURE 3 is a schematic representation of counting circuits utilized in master and remote station transceivers in accordance with the invention.
Figure 4:
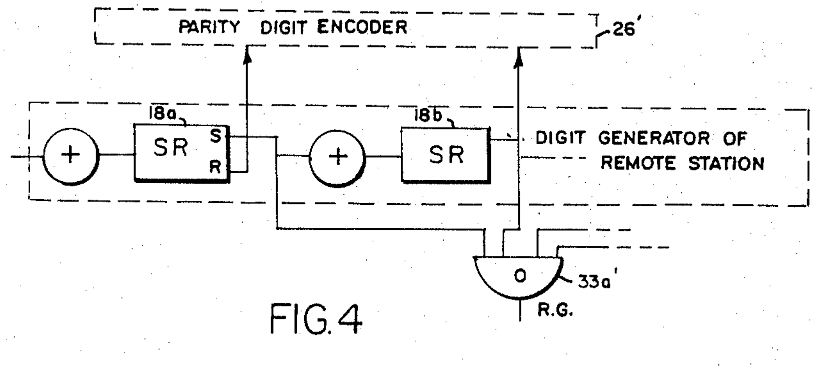
FIGURE 4 is a schematic representation of a portion of a transceiver of a remote station in accordance with the invention.

For the purposes of simplicity, when these symbols of FIGURE 9 are utilized in FIGURES 2–4, the inputs and outputs will be identified by being positioned in the same manner as the corresponding terminal shown in FIGURE 9.

Opposite the symbol for the modulo-two adder, there is a list of the various rules associated with modulo-two addition so as to facilitate later discussion.

Referring now to FIGURE 3, there is illustrated

COUNTDOWN CIRCUIT 28 which is driven by MASTER OSCILLATOR 29 to provide timing signals which are various multiples of the frequency of signal 1BR. This signal has a rate which is equal to the rate of the signal bit upon the channel. It will be appreciated that the frequency of signals 2BR, 3BR, and 5BR are twice, four, and sixteen times the frequency, respectively, of the bit rate signal 1BR. Signals $\overline{2BR}$ and $\overline{3BR}$ are merely the complements of signals 2BR and 3BR, respectively.

BIT COUNTER 30, which is comprised of a pair of shift registers connected to provide a counting function, provides an output signal BC4 on conductor 31 for every fourth pulse applied to its input. This counter thus provides means for counting the incoming bits of signal information and providing a signal BC4 every fourth signal bit. This signal is utilized for control purposes hereinafter described and it also drives DIGIT COUNTER 32. BIT COUNTER 30 is comprised of two stages since the illustrated preferred embodiment of the invention operates in the binary coded decimal system of notation wherein a digit is represented by four signal bits.

The following detailed description will trace the operation of the system through one complete cycle of operation covering the transmission of a command to a point of a remote station followed by the remote station response.

*Transmission by master station*

Referring now to the timing diagram of FIGURE 8 and assuming that the first three digits of the message, i.e., $D_1$, $D_2$ and $D_3$, which are illustrated in the left-hand column of the chart of FIGURE 5 entitled "Master Station," are read out of source 11 parallel by bit and serially by digit, the DIS enabling signal will enable the input gates of BUFFER 13 to permit the parallel transfer of the bits into shift register stages 13*a*–13*d*. This information is directly entered into these shift registers without the presence of a shift pulse due to their connection to the SET inputs of the shift registers. The information registered in these stages is then transferred into the input stages of registers 13*a'*–13*d'* in response to the application of LSP logic shift pulses generated by AND gate 9*d* to the SHIFT inputs of these registers through OR gate 9*b*. These pulses, which are generated in response to the pulses on DATA SHIFT BUSES, are in synchronism with the appearance of the digits upon the DISTRIBUTION BUSES. Thus, upon the termination of data shift pulse DS1, the contents of shift register 13*a*–13*d* will be placed in the first stages of shift register 13*a'*–13*d'*. Upon completion of DS3, the entire message to be transmitted will be stored in BUFFER 13. Thereafter, when the programmer is told to TRANSMIT this signal, it generates the INITIATE and DS1 signals and addresses the transceiver by sending the appropriate code on the units and tens ADDRESS BUSES. When these signals coincide, AND gate 25*b* is operated to set shift register 25*c* which enables gate 25*d* to permit the 5BR signal to set flip-flop 52*e*. This flip-flop provides the transmit-enable signal TE and, in addition, when the receiver is in its reception mode of operation, the reset output of flip-flop 25*e* provides the TRANSMITTER RESET signal which enables gates in the VALIDITY DETECTOR 22.

Transmit enables signal TE, when applied to gates 16*a* and 16*b*, generates, in conjunction with signals 1BR, 3BR, D1, and $\overline{D1}$, the bit shift transmit signal BST which operates the OUTPUT SHIFT REGISTER 16 to place the transmission upon the channel.

The BST signal, in conjunction with bit counter signals C1 and C2, is also applied to AND gate 9*e* to generate the necessary shift pulses for shifting the information out of registers 13*a'*–13*d'* during a transmission operation. Since signals C1 and C2 are both only in their 1 condition every fourth BST signal, shifting takes place only one every four bits, i.e., once each complete cycle of BIT COUNTER 30. The bit counter also provides appropriate timing signals to operate COMMUTATOR 15 to commutate the information contained in the output stages of registers 13*a'*–13*d'* to convert parallel information in the shift registers into a serial pulse train which appears at the output of OR gate 15*a*.

Gate 16*a*, which operates at four times the bit rate 1BR due to signal 3BR, is utilized to generate the sync digit. Referring now to FIGURE 8, it can be seen that during the first digit period D1, the BST signals operate to cycle the bit counter through a complete cycle of operation during which time the contents of shift registers 16*c*, 16*d*, 16*e*, and 16*f* are placed on the channel to provide the sync pulse. These shift registers are all in their 1 condition at the beginning of the cycle due to the fact that the SYSTEM RESET signal generated by BIT COUNTER 30 is normally 1 and then goes to 0 when TE goes to a 1 condition. Shift register stage 16*g* is provided to place a 0 upon the common communication channel when the transceiver is in standby condition.

Thereafter the BST signals generated by AND gate 16*b* control the shifting of the information appearing at the output of COMMUTATOR 15 through OUTPUT SHIFT REGISTER 16 to the common communication channel.

At the same time that the message to be transmitted is being applied to OUTPUT SHIFT REGISTER 16, it is also applied through gate 18*k* and gate 18*f* to the input of modulo-two adder 18*g*. Thus, this message goes through the convolutional processing, and it may be seen with reference to FIGURE 5 that after the three digits of the message are applied to DIGIT GENERATOR 18, the AND gates of COMMUTATOR 15 are inhibited by $\overline{D4}$, thus causing the output of COMMUTATOR 15 to assume its 0 condition during digit period D4. Thus, four zeros are shifted into the digit generator following the first three informational digits. When the last zero enters shift register 18*a*, DIGIT GENERATOR 18 will assume a condition of 1010 in a manner which will be apparent when referring to the chart of FIGURE 5. This digit is transmitted through PARITY DIGIT TRANSFER CIRCUIT 26 to the OUTPUT SHIFT REGISTER at the beginning of digit period D5.

*Reception by remote station*

The timing diagram of FIGURE 7 illustrates the signals generated at various points in the master station transceiver upon receipt of the message 10110010100010101 from the common channel. This message consists of a sync bit plus four digits, the first three being information digits and the last being the parity digit obtained by encoding the digit in DIGIT GENERATOR 18 of the transmitting station. This message is applied to the input of AND gate 14*a* which is enabled by signal $\overline{TE}$ since this signal is normally in its 1 condition except when TRANSMITTER ENABLE GENERATOR 25 has been operated to place the transceiver in its transmitting mode. Thus, the message will be applied to the input of INVERTER 14*c* through AND gate 14*b* which will be enabled by RE.

RE is normally in its 0 state until RECEIVER ENABLE GENERATOR 27 has been operated by the sync bit which is applied to AND gate 27*a*. This gate will be enabled due to the fact that shift register 27*b* is normally in its reset condition when the transceiver is in its standby condition. Therefore, gate 27*a* is enabled to supply the sync bit to inverter 27*c* which provides a negative going signal which causes shift register 27*b* to shift to its set condition since the steer input is connected to a positive potential which is representative of a 1 on this input. Thus, the set output of shift register 27*b* will go to its 1 condition to provide the required receiver enable signal RE.

The presence of signal RE enables gate 14*b* so as to apply the sync bit plus the remaining four digits of the incoming message to BUFFER 13. The units digit of the incoming message is then shifted in bit-by-bit into the series-connected shift registers 13*a*–13*d* under control of shift pulses BSR which are generated at the output of gate 9*a* of BUFFER CONTROL 9.

Referring now to FIGURE 7, it can be seen that the BSR pulses are at the same rate as 1BR, i.e., the bit rate, while the length of these pulses is half that of 1BR.

In response to the $\overline{BSR}$ shift pulses provided at the output of inverter 13*e*, the sync bit as well as the 1, 2, 4, and 8 bits of the units digit will be serially shifted into shift registers 13*a*–13*d*. In response to the receipt of the fourth $\overline{BSR}$ pulse after the initial entry of the sync bit into shift register 13*a* the units digit will be contained in these shift registers while the sync bit is shifted off the end of shift register 13*d*.

Referring now to FIGURE 3, it can be seen that AND gate 30*a*, which is enabled by signal RE, applies the $\overline{BSR}$ pulses to the bit counter which is initially reset to its 01 condition by either RE or TE so that the sync bit may be taken into account when the units digit of the information message is serially shifted into shift registers 13*a*–13*d*. Once this information is registered, the logic shift pulses LSP generated by gate 9*c* control the parallel shifting of information from registers 13*a*–13*d* to registers 13*a'*–13*d'*. Each time BIT COUNTER 30 indicates a count of 4, i.e., C1 and C2 are in their 1 condition, and BSR goes from 1 to 0, shift registers 13*a'*–13*d'* operate since, as was hereinbefore pointed out, the shift registers operate on the trailing edge of the shift pulses. Thus, at the end of the first digit period D1, the units digit is shifted into the first stage of each of registers 13*a'*–13*d'*. During the second digit period D2, the tens digit of the station address is being read into registers 13*a*–13*d*. In like manner the third digit, or command digit, is read into registers 13*a*–13*d* during the third digit period; and at the end of this digit period this information is shifted into registers 13*a'*–13*d'* on the trailing edge of the fourth BSR pulse during this period.

The $\overline{D4M}$ signal applied to gate 9*c* assumes its zero condition during the fourth digit period, preventing the shifting of the parity digit into registers 13*a*–13*d*. Thus, upon completion of the third digit period, the information digits are registered in BUFFER 13 where they will be held awaiting the outcome of the transmission fault and remainder test which will now be described.

BIT and $\overline{BIT}$ signals are applied to the shift inputs of registers 19*a* and 19*b*, respectively, of TRANSMISSION FAULT DETECTOR 19; and since the steer input of each of these registers is connected to a positive potential, the presence of a pulse on their SHIFT inputs will cause these registers to assume a set condition. This will cause the generation of a signal which is applied through OR gate 19*c* to an input of AND gate 19*d*.

Means is provided by OR gate 19*e* and inverter 19*f* to reset the shift registers the first time that signal $\overline{3BR}$ goes to 0 after the beginning of each bit period. This will occur during the second eighth of the bit period due to the presence of all zeros upon the input of gate 19*e* during this time. This will cause the output of inverter 19*f* to assume a one condition during this period, thus resetting the shift registers. It is noted that during the first eighth of the bit period, which is used as a guard period, changes of state of the BIT or $\overline{BIT}$ signals will have no effect since AND gate 19*d* is operative only to allow the condition of the shift registers to be sensed during the fourth positive going pulse of 3BR during the bit period. Thus, upon completion of the resetting operation, i.e., at the end of the first quarter of the bit period, the output of inverter 19*f* will no longer inhibit the shifting of the registers, which can occur right up until the beginning of the time that gate 19*d* is no longer enabled by 1BR and $\overline{3BR}$. This will occur shortly after the start of the last quarter of the bit period. Therefore, changes of state taking place during the second and third quarter of the bit period will be sensed. Thus, if the signals BIT or $\overline{BIT}$ change state during this period, the corresponding shift register will be shifted to its 1 condition, and this condition will be read out by gate 19*d* at the end of the period so as to provide a signal on conductor 20 that indicates a transmission fault has taken place. Since a remote station differs from the master station of FIGURE 2 only in the construction of the PARITY DIGIT TRANSFER CIRCUIT and REMAINDER DECODER, reference may be had to FIGURE 2 as modified by FIGURE 4 for the purpose of this example. Thus, encoder 26' of FIGURE 4 is substituted for encoder 26 of FIGURE 2 while decoder 33' is substituted for decoder 33 of FIGURE 2.

It is an important feature of this invention that these encoders and decoders differ only in their manner of connection to shift register stage 18*a* of the digit generator. AND gate 26*a'* of a remote station is connected to the reset output R of shift register 18*a* while one input of gate 33*a'* is connected to the set output of shift register 18*a*. Reference to FIGURE 2, which illustrates the construction of a master station, discloses that these connections to stage 18*a* of the digit generator are the reverse of those in the master station.

Referring now to FIGURE 5, there is illustrated in the left-hand column of the chart entitled "Remote Station" the signals which will be applied to the input of DIGIT GENERATOR 18 through OR gate 18*f* when gate 18*e* is enabled by RE.

The digit generator is illustrated as comprising, in addition to stages 18*a*–18*d*, modulo-two adders 18*g* and 18*h* which are connected to the set output of shift register 18*d* through conductor 18*i*. This will result in the dividing of the incoming signal by $1+X+X^4$, this polynomial being the generator polynomial. The shifting of the information into the digit generator during a reception phase of operation takes place in response to the shift pulses appearing at the output of AND gate 18*j*. The $\overline{D0}$ input is provided to prevent the entry of the sync pulse into the digit generator. This is accomplished since $\overline{D0}$ is in its 0 condition until after the $\overline{BSR}$ pulse associated with the sync pulse goes to 0. Therefore, the output of gate 18*j* goes from 1 to 0 only in response to the 1 bit pulse of $\overline{BSR}$. Therefore, the sync digit is not shifted into digit generator 18.

Thereafter, the BIT signal applied to the digit generator is processed in a convolutional manner during the first, second, third, and fourth digit periods. This sequence in the various states of the stages of the digit generator 18 are disclosed in the chart of FIGURE 5. Upon completion of the fourth digit period, if no errors have taken place in the transmission, the remainder of 0000 will be contained in stages 18*a*–18*d*. Under this condition gate 33*a'* will have all its inputs connected to 0, thus resulting in output signal RG upon conductor 21 remaining at its 0 condition.

Thus, if the received message passes both tests, conductors 20 and 21 will be at their 0 levels and consequently, flip-flop 22*a* will remain in its reset condition. Consequently, when PROGRAMMER 10 thereafter interrogates the transceiver to determine whether it has a message to be read out, AND gate 22*b* will operate since the reset output of flip-flop 22*a* will be at a 1 level. Thus, the output of gate 22*b* will be indicative of a valid code and will hereafter be identified as a VC signal.

Under normal circumstances flip-flop 22*c* will remain in its reset condition until digit pulse D5 occurs, which will cause gate 22*d* to operate and place the flip-flop in its set condition. Consequently, gate 22*e* cannot be operated in response to the INTERROGATE signal. Consequently, its output will remain at the 0 level, which, when inverted, will give the ready receive signal RR. Coincidence of VC and RR will cause gate 22*f* to operate and provide READOUT TRANSCEIVER signal on conductor 23 which is applied to the programmer. This signal causes the initiation of the programmer control signal sequence which causes the information stored in registers 13*a'*–13*d'* to be read out through the buffer output gates onto the COLLECTION BUSES upon their being enabled by the collection-enabling signal COL.

*Transmission by REMOTE station*

A transmission from the remote station will take place in a manner identical with that discussed with respect to the master station except that, due to the difference in parity digit encoder 26', the parity digit transmitted to the master station will be 0010 as may be seen by reference to FIGURE 6. It will be seen that when this parity digit is received by the master station, the correct remainder of 1000 will be found in digit generator 18.

*Reception by master station*

The previous description of a remote station reception operation is equally applicable to the operation of the master station transceiver except for the differences associated with the different parity digit encoder and remainder encoder. Reference may be had to FIGURE 6 and the chart entitled "Master Station" for an illustration of the manner in which the remainder 1000 will be formed in a master station when a correct message is received by the master station. Since the remainder decoder 33 of the master station has one input connected to the reset output of shift register 18*a*, this gate will provide a 0 output on conductor 21 when the remainder contained in digit generator 18 is 1000. Thus, the master station will accept transmissions leaving this remainder in the digit generator.

Of course, it will be recognized that the transmission fault detector of a master station transceiver operates in the same manner hereinbefore noted with respect to the remote station transceiver.

It will thus be appreciated that, in accordance with the invention, identical transceivers may be utilized for remote and master stations of a nonlockout type of telemetering system with only minor modifications so as to obtain not only the error-detecting function but also the message-routing function which prevents one remote station from actuating another remote station.

In the following claims, the term "convolutional" is employed to identify a type of signal processing in which a continuous bit-by-bit check takes place on the digits of a message again previously checked digits of the message.

Consequently, the invention is not limited to the specific system disclosed. Therefore, it will be appreciated that the invention is not limited to use of a digit generator in which the generator polynomial is $1+X+X^4$, nor is it limited to a system in which the message routing function is accomplished by operating upon the bit stored in the first stage of the shift register. Furthermore, it is also apparent that the digit generated can be encoded and decoded so as to permit the master station to accept messages providing a 0000 remainder while the remote stations will accept a 1000 remainder. Of course, it will also be appreciated that remainders other than those selected can be utilized.

What we claim as new and desire to secure by Letters Patent of the United States is:

1. An electronic error detection and message routing system for a digital communication system utilizing a common channel between a master station and a plurality of remote stations, wherein information is processed in the format of digital pulse sequences having a message including a plurality of message bits, each of said stations comprising:

(a) means for generating a parity digit including a plurality of parity bits during a transmission phase of operation by processing in a convolutional manner the message bits received for transmission, (b) means operative during the transmission phase of operation for transferring the parity digit to said common channel to be transmitted after the message bits have been transmitted, (c) said digit generating means being operative during a recepion phase of operation for processing in a convolutional manner message bits and parity bits received from the channel, (d) means operative during the reception phase of operation for decoding the information remaining in said digit generating means upon completion of said convolutional processing of the rceeived message, and (e) means responsive to said decoding means providing an acceptable digit for causing the station to accept the received message as a valid message intended for that station, (f) said generating and transfer means of each of said remote stations generating a parity digit which, when received and decoded by said master station, will provide said acceptable digit but, when received and decoded by the other remote stations, will not provide said acceptable digit, whereby said parity digit is used to detect transmission errors and to prevent transmissions intended for the master station from being received by other remote stations.

2. An electronic error detection and message routing system for a digital communication system utilizing a common channel between a master station and a plurality of remote stations, wherein information is processed in the format of digital pulse sequences having message digits including message bits, each of said stations comprising:

(a) means for generating a parity digit including a plurality of parity bits during a transmission phase of operation by processing in a convolutional manner message bits received for transmission, (b) means operative during the transmission phase of operation for transferring the parity digit to said common channel to be transmitted after the message bits have been transmitted, (c) said digit generating means being operative during a reception phase of operation for processing in a convolutional manner message bits and parity bits received from the channel, (d) means operative during the reception phase of operation for decoding the information remaining in said digit generating maens upon completion of said convolutional processing of the received message, and (e) means responsive to said decoding means providing an acceptable digit for causing the station to accept the received message as a valid message intended for that station, (f) said generating and transfer means of all stations of one type and said decoding means of all stations of the other type providing a straight transfer of information from said digit generating means when information is being transmitted from said one type station to said other type station while said generating and transfer means of all stations of said other type and said decoding means of all stations of said one type each provide information transfer in which the same digit bit in said digit generating means is complemented during a transmission from said other type station to said one type station, whereby said parity digit is used to detect transmission errors and to prevnet transmission of information between stations of the same type.

3. The combination of claim 2 in which said digit generating means comprises a multi-stage shift register, means for feeding back signals appearing at the output of a given stage, and means for performing modulo-two addition of said feedback signals with signals appearing at the outputs of one or more prior stages of said register and applying the resultant summation signals to the inputs of the next succeeding stage.

4. The combination of claim 3 in which each of said stages has set and reset outputs and said one type station is a master station and said other type station is a remote station, and said transfer means of said master station comprises a first plurality of AND gates equal in number to the number of stages of said digit generating means, and means for connecting one of said gates of said first plurality to each set output of said stages to provide a straight parallel transfer of the remainder in said shift register when said gates are operated, said decoding means of said remote stations comprising an OR gate connected to the set outputs of each of said stages.

5. The combination of claim 4 in which said feedback and said summation signal connections are selected so that the parity digit generated at said master station will result in each of the stages of said shift register of a called remote station being in its reset condition upon receipt of the transmitted information without intervening transmission errors, said means responsive to said decoding means being operative when the output of said OR gate is in its ZERO condition for causing the remote station to accept the message.

6. The combination of claim 5 in which said transfer means of said remote stations comprises a second plurality of AND gates equal in number to the number of stages of said digit generating means, means for connecting all but one of said gates of said second plurality to the set outputs of corresponding stages of said shift register, and means for connecting the remaining gate of said second plurality to the reset output of the corresponding stage to complement one bit of the generated digit so as to provide the required parity digit, said decoding means of said master station comprising a second OR gate connected to the set outputs of each stage except for the stage corresponding to said complemented bit stage which has its reset output connected thereto, whereby said parity digit encoded by a remote station will result in the output of said second OR gate being in its ZERO condition while the outputs of the OR gates of other remote stations will be in their ONE condition, thus preventing them from accepting a message from another remote station.

7. The combination of claim 2 in which each station further comprises means connected to said common channel during a reception phase of operation for detecting changes in state of the signals on said channel during a portion of each bit period, said portion being selected being one in which no change would take place upon receipt of an error-free transmission.

said means responsive to said decoding means being operative when such a change in state is detected for causing the station to reject the received message.

8. The combination of claim 7 in which said change of state detecting means comprises a shift register having its shift input connected to said channel and its steer input connected to a potential such that a change of the potential applied to said shift input will cause said register to change state, and means connected to the reset input of said shift register for inhibiting said register change of state except during said selected portion of said bit period.

References Cited

UNITED STATES PATENTS

| | | | |
|---|---|---|---|
| 3,064,080 | 11/1962 | Rea et al. | 340—146.1 X |
| 3,069,657 | 12/1962 | Green et al. | 340—146.1 X |
| 3,141,928 | 7/1964 | Davey et al. | 340—146.1 X |
| 3,252,138 | 5/1966 | Young | 340—146.1 |

MALCOLM A. MORRISON, *Primary Examiner.*

CHARLES E. ATKINSON, *Assistant Examiner.*

U.S. Cl. X.R.

325—41